(12) United States Patent
Dujisin et al.

(10) Patent No.: US 10,990,927 B2
(45) Date of Patent: Apr. 27, 2021

(54) SYSTEMS AND METHODS FOR MANAGING MOBILE WORKERS

(71) Applicant: SYNCrew, Inc., Oakland, CA (US)

(72) Inventors: Daniel Mario Muharay Dujisin, San Francisco, CA (US); John David Cranston, Woodside, CA (US)

(73) Assignee: SYNCrew, Inc., Oakland, CA (US)

( * ) Notice: Subject to any disclaimer, the term of this patent is extended or adjusted under 35 U.S.C. 154(b) by 0 days.

(21) Appl. No.: 15/003,788

(22) Filed: Jan. 21, 2016

(65) Prior Publication Data

US 2016/0217422 A1 Jul. 28, 2016

Related U.S. Application Data

(60) Provisional application No. 62/106,695, filed on Jan. 22, 2015.

(51) Int. Cl.
*G06Q 10/10* (2012.01)
*H04W 4/021* (2018.01)
*G01S 19/14* (2010.01)

(52) U.S. Cl.
CPC ............ *G06Q 10/103* (2013.01); *G01S 19/14* (2013.01); *G06Q 10/1091* (2013.01); *H04W 4/021* (2013.01)

(58) Field of Classification Search
CPC . G06Q 10/103; G06Q 10/1091; H04W 4/021; G01S 19/14
See application file for complete search history.

(56) References Cited

U.S. PATENT DOCUMENTS

| 5,918,219 | A  | * | 6/1999 | Isherwood | G06Q 10/04 235/378 |
| 7,004,389 | B1 | * | 2/2006 | Robinson  | G06Q 10/06 235/382 |
| 10,062,042 | B1 | * | 8/2018 | Kelly    | G06Q 10/063112 |
| 10,395,187 | B2 | * | 8/2019 | Weyl     | G06Q 10/06311 |

(Continued)

OTHER PUBLICATIONS

The best apps for freelancers, PCWorld.com, Dec. 20, 2014 (Year: 2014).*

*Primary Examiner* — Nathan A Mitchell
*Assistant Examiner* — Denisse Y Ortiz Roman
(74) *Attorney, Agent, or Firm* — Finnegan, Henderson, Farabow, Garret & Dunner, LLP

(57) ABSTRACT

The present disclosure provides an improved network for tracking and managing mobile workers, which includes storing, tracking, and managing information associated with mobile workers and projects. The mobile workers may use a mobile communications system, such as a mobile device, to log their project with associated data, after which the data can be uploaded in real-time or stored locally until connectivity is available to the platform. Business owners or managers and individuals can review work performance and automatically create required business reports. The mobile worker may use the mobile device to clock in and out of each project through a worker presence verification method that may include obtaining an image/photograph or video of the worksite, location data (e.g., global positioning (GPS) coordinates), and a timestamp to ensure that the mobile worker is at the worksite and working on the appropriate project.

20 Claims, 4 Drawing Sheets

(56) References Cited

U.S. PATENT DOCUMENTS

| | | | |
|---|---|---|---|
| 2002/0175211 A1* | 11/2002 | Dominquez | G07C 1/10 |
| | | | 235/492 |
| 2014/0012616 A1* | 1/2014 | Moshenek | G06Q 10/063114 |
| | | | 705/7.15 |
| 2014/0039954 A1* | 2/2014 | Wong | G06Q 10/063118 |
| | | | 705/7.14 |
| 2014/0095119 A1* | 4/2014 | Lee | G06Q 10/0631 |
| | | | 703/1 |

* cited by examiner

SYSTEMS AND METHODS FOR MANAGING MOBILE WORKERS

This application claims priority to U.S. Provisional Patent Application No. 62/106,695, filed Jan. 22, 2015, the disclosure of which is expressly incorporated herein by reference in its entirety.

The present disclosure generally relates to mobile communications systems. Specifically, the present disclosure relates to systems and methods for tracking and managing information associated with mobile workers.

Businesses and individuals frequently use mobile workers to complete projects in remote locations. Remote locations may include, for example, locations other than a business's primary location, such as customer sites, business and sales conventions, home offices, building and construction sites, outdoor locations, etc. In recent years, businesses and individuals have increasingly relied on mobile communications systems, such as wireless devices, to communicate with mobile workers located at remote worksites. Such communication may include, for example, voice calls, text messages, or emails. A business or individual may communicate a project to the mobile worker via the mobile communications system. The business or individual may periodically contact the mobile worker using the mobile communications system to check the status of the project. Once the project is complete, the mobile worker may report the completion to the business or individual.

Current mobile communications systems and methods, however, do not allow the business or individual deploying the mobile worker to visually verify that the mobile worker has completed the project, and that the project was completed in a satisfactory manner. Moreover, current systems and methods of mobile communications do not provide the business or individual with the ability to periodically track the mobile worker to ensure the mobile worker is at the worksite performing the project. Further still, current systems and methods of mobile communications do not provide the business or individual with the ability to visually verify that the mobile worker has arrived at the worksite and has begun working on the project. Still further, current systems and methods of mobile communications do not provide the business or individual with the ability to track how far a mobile worker is from the worksite. As such, there is a need in the art of mobile communications systems and mobile worker management to overcome the lack of information transparency that results from the shortcomings of current systems and methods of mobile communications.

The present disclosure addresses at least some of these shortcomings by providing improved methods and systems for tracking and managing mobile workers. Moreover, the present disclosure addresses at least some of these shortcomings by providing a way to store, track, and manage information associated with mobile workers and projects.

The present disclosure relates to embodiments for tracking and managing mobile workers. Moreover, embodiments of the present disclosure include systems, methods, and computer-readable media used in the managing of mobile workers. As will be appreciated, embodiments of the present disclosure may be implemented with any combination of hardware, software, and/or firmware, including computerized systems and methods embodied with processors or processing components.

It is to be understood that both the foregoing general description and the following detailed description are exemplary and explanatory only, and are not restrictive of the invention, as claimed.

The accompanying drawings, which are incorporated in and constitute a part of this specification, illustrate the disclosed embodiments and, together with the description, serve to explain the principles of the disclosed embodiments.

Figure 1:
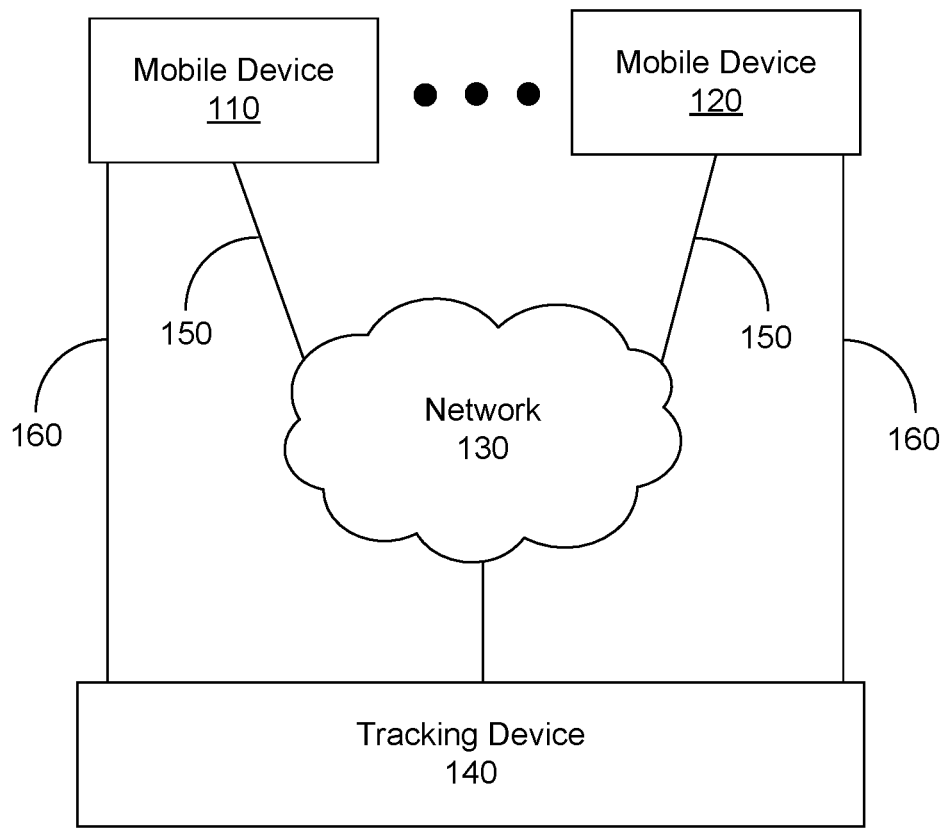
FIG. 1 illustrates an example system for implementing some embodiments and aspects of the present disclosure.

Embodiments of the present disclosure provide improved systems and methods for managing mobile workers. The disclosed embodiments provide a platform to manage mobile workers and their projects. The mobile workers may use a mobile communications system, such as a mobile device, to log their project with associated data. The data may be uploaded in real-time or stored locally until connectivity is available to the platform. Business owners or managers and individuals can review work performance and automatically create required business reports, including timesheets. Further, the data can trigger automated marketing including online review requests and "service due" reminders via email, mail, and any other known communications methods.

In some embodiments, the mobile device may conveniently maintain a database of projects associated with a mobile worker. The mobile worker may use the mobile device to clock in and out of each project using a 3-phase worker presence verification method. The worker presence verification method may include obtaining an image/photograph or video of the worksite, obtaining location data (e.g., global positioning (GPS) coordinates), and obtaining a timestamp to ensure that the mobile worker is at the worksite and working on the appropriate project.

In some embodiments, the platform may include a tracking device configured for managing mobile workers. The tracking device may receive data collected by mobile devices associated with mobile workers. The received data may be tracked at different levels, for example, at the worker level, team level, or project level. The tracking device may use the received data to generate summary and performance reports and timesheets, as well as generate and send real-time alerts to mobile devices. Moreover, the tracking device may store the received data so that it can be accessed by businesses and customers through convenient database filtering and search techniques. By storing the verification data received from mobile workers, a historical database of all work performed and completed can be maintained.

Accordingly, the improved systems and methods disclosed herein provide businesses and individuals with the ability to automate and streamline monitoring of mobile workers. For example, the improved systems and methods disclosed herein may improve operating efficiency by providing automated monitoring of remote worksite projects at the worker, team, or project level. Moreover, the improved systems and methods disclosed herein may minimize a business's costs associated with unauthorized overtime by providing notifications to mobile workers and their managers as clock-out time approaches. The improved systems and methods disclosed herein also may improve a business's or individual's management of mobile workers by providing alerts to mobile workers and their managers that the system has sensed the mobile worker is no longer within the geographical area of the project they are clocked into. The system may also send mobile workers data and/or pictures conveying information about hours and jobsites. Furthermore, the improved systems and methods disclosed herein may improve marketing of a business by providing notifications to customers that service is past due or post-service customer satisfaction surveys.

The improved systems and methods disclosed herein provide accountability for the tasks and projects worked on and completed by mobile workers by introducing a visual element to mobile worker management. By requiring mobile workers to visually document (with photographs or videos, for example) their clock-ins, clock-outs, and completed project, businesses and customers can quickly resolve issues with billing, unsatisfactory services, or problems that may arise relating to the work performed. For example, a business that performed a window washing service for a customer may provide the customer with the photographs and/or videos collected by the mobile worker's mobile device to show that the window washing service was completed properly. As another example, if a customer contacts a business that performed an HVAC installation regarding a malfunctioning air conditioner, the business can provide the customer with visual documentation showing the air conditioner was properly installed according to relevant building codes. Moreover, the business can identify the mobile worker who performed the air conditioner installation by using historical information (e.g., clock-in and project completion data) stored by the tracking device. That way, for example, the mobile worker can provide suggestions to the customer as to why the air conditioner might have failed, and so that the mobile worker can perform a repair service on the air conditioner.

Reference will now be made in detail to exemplary embodiments, examples of which are illustrated in the accompanying drawings. Wherever possible, the same reference numbers will be used throughout the drawings to refer to the same or like parts.

FIG. 1 illustrates a system 100 for managing mobile workers. System 100 may include mobile devices 110 and 120, a tracking device 140, and a network 130. System 100 is an example. The number and distribution of the various entities shown in system 100 may be different depending on specific embodiments. For example, the components in system 100 may be combined and/or distributed over multiple entities, including other computers, handheld computers, mobile phones, tablet computers, or other computing platforms. Thus, the configuration described in system 100 is exemplary only and is not intended to be limiting.

Mobile devices 110 and 120 may be associated with one or more mobile workers. A mobile worker may be any worker that operates at a remote or customer location ("worksite"). For example, a mobile worker may be dispatched from a central location to a worksite to perform recurring projects such as trash removal services or house cleaning services. Moreover, a mobile worker may be dispatched to perform traditionally one-time projects such electrical repair services. Further, a mobile worker may be dispatched to perform hybrid projects (i.e., one-time and recurring) such as heating, ventilating, and air conditioning (HVAC) services (e.g., installation, repair, routine maintenance, etc.). In some embodiments, a mobile worker may be an employee of a business and may be dispatched to the customer worksite by the business. For example, the business may be a construction business or other business that employs mobile workers to perform certain tasks at customer worksites such as, but not limited to: excavation, drywall, framing, siding, concrete and masonry, steel work, flooring, carpentry, painting and wallpaper, asbestos removal, mold remediation, door installation, window and glass, fencing, pavement, energy efficiency enhancement (insulation, etc.), solar systems, HVAC, electrical, cleaning, roofing, power washing, lighting, welding, appliance installation and repair, landscaping, pool installation and maintenance, or any other construction-related tasks known in the art. Other examples of businesses that employ mobile workers include: pest control, gardening, janitorial services, window washing, gutter cleaning, tree trimming, snow removal, locksmith, sales, dog walking, delivery and courier services, architectural and graphic design, home monitoring services, on-site medical and healthcare givers, on-side childcare, traveling professional services (e.g., notaries, lawyers, accountants, engineers, etc.), moving companies, apartment inspection services, real estate inspection services, security services, or any other businesses employing mobile workers known in the art.

In some embodiments, a mobile worker may be a subcontractor or subcontracting business employed by a business. The subcontractor or subcontracting business may be involved in any of the businesses described above and employ mobile workers that perform any of the tasks described above. Alternatively, the mobile worker may be an independent contractor that is employed directly by the customer to perform any of the tasks described above. Mobile devices 110 and 120 may also be used by consumers for tracking purposes. For example, a parent may associate a mobile device with a child, and the child may use mobile device 110 or 120 to check in with the parent so that the parent is aware of the child's location. Moreover, a consumer may use mobile device 110 or 120 to confirm the location of third parties, for example, to verify that a child was dropped off at the right time and place in a split custody arrangement. Mobile devices 110 and 120 may include smartphones, tablets, notebooks, electronic readers, personal digital assistants, personal computers, laptop computers, desktop computers, large display devices, and/or other types of handheld, electronics, or communication devices.

In some embodiments, mobile devices 110 and 120 may include a project screen. The project screen may list each project associated with a business, customer, subcontractor, and/or mobile worker that is associated with the mobile device. In some embodiments, project screen may list projects assigned to the mobile worker. In some other embodiments, project screen may only list a portion or subset of the projects. Mobile device 110 or 120 may determine which projects are associated with a business, customer, subcontractor, and/or mobile worker by, for example, receiving the information from a tracking device or receiving login information from the mobile worker (e.g., username and password). Mobile device 110 or 120 may list the projects in any order known in the art. For example, projects may be listed based on proximity to the mobile worker, due dates for the projects, customers for the projects, oldest projects listed first, newest projects listed first, etc. In some embodiments, projects may be listed in an order determined by the business and/or customer. If projects are listed based on proximity to the mobile worker, mobile device 110 or 120 may obtain the mobile worker's location. For example, mobile device 110 or 120 may be equipped with GPS capability and may use the GPS capability to obtain GPS coordinates associated with the mobile worker's location. It is noted that other location devices and technologies may be used to obtain the mobile worker's location. For example, mobile device 110 or 120 may be further equipped with wireless networking capability (e.g., Wi-Fi) and may use the wireless networking capability to augment the GPS capability, thereby improving the accuracy of the obtained mobile worker's location. As another example, other global navigation satellite systems (GNSS) may be used in place of, or in concurrently with, GPS, such as Galileo, GLONASS, BeiDou, DORIS, IRNSS, or any other GNSS known in the art. Mobile device 110 or 120 may use the mobile worker's location to determine the order of projects by comparing the distances between the mobile worker's location and the locations of the projects associated with the business, customer, subcontractor, and/or mobile worker. The system also allows mobile workers to access data including, but not limited to, hours worked, pictures, notes, jobsites and locations on mobile device 110 or 120.

Tracking device 140 may be used by businesses and/or customers to track and manage various aspects of worksite projects. For example, tracking device 140 may be used to track the number of projects assigned to a worksite, the number of projects actively being worked by mobile workers at the worksite, and the total number of hours (e.g., man-hours) worked for a given day at the worksite. As another example, tracking device 140 may be used to track the status of mobile workers assigned to a worksite, the number of mobile workers that are currently clocked in and working on a project, and the amount of total hours worked by each mobile worker or on a given project. Tracking device 140 may include smartphones, tablets, notebooks, electronic readers, personal digital assistants, personal computers, laptop computers, desktop computers, large display devices, and/or other types of handheld, electronics, or communication devices.

In some embodiments, tracking device 140 may be configured to communicate through wired or wireless connections 150 to and/or through network 130 with one or more mobile devices such as mobile device 110 and 120 and vice-versa. Network 130 may include any combination of communications networks. For example, network 130 may include the Internet and/or any type of wide area network, an intranet, a metropolitan area network, a local area network (LAN), a wireless network, a cellular communications network, etc. In some embodiments, tracking device 140 may be configured to transmit requests (e.g., requests based on input provided by one or more users) or other data through network 130 to an appropriate mobile device. Tracking device 140 may also be configured to receive information from mobile device 110 and/or 120 through network 130, including data or content sent in response to such requests.

In some embodiments, when the network 130 loses connectivity, the system can adapt by enabling all data and content to be stored in mobile devices 110 and/or 120. This allows the mobile worker to continue using the invention despite intermittent or no connection to network 130. When network 130 connection is restored, mobile devices 110 and/or 120 will send the stored data to the tracking device 140.

In some embodiments, tracking device 140 may be configured to communicate with one or more mobile devices through one or more peer-to-peer connections 160. Peer-to-peer connections 160 may be implemented using any suitable combination of peer-to-peer communication technologies. For example, peer-to-peer connection 160 may utilize near-field communication (NFC), Wi-Fi Direct, Bluetooth, and/or any other form of peer-to-peer connection. In some embodiments, peer-to-peer connection 160 may comprise a wireless connection. In other embodiments, peer-to-peer connection 160 may include a wired connection.

In some embodiments, mobile devices 110, 120 may transmit data collected at or near the worksite. For example, a mobile device may collect data that reflects the status of a mobile worker working on a project. The mobile worker may be clocked into a project, on break, or clocked out of a project. The mobile device may also collect data that reflects a change in status of a mobile worker. For example, the collected data may indicate that a mobile worker has clocked into a project, clocked out of a project, taken a break, or has left the worksite. In some embodiments, tracking device 140 may aggregate and group the data received from mobile devices 110 and 120. Tracking device 140 may use the aggregated and grouped data to generate summary reports, performance analyses, timesheets, alerts, and marketing communications.

Figure 2:
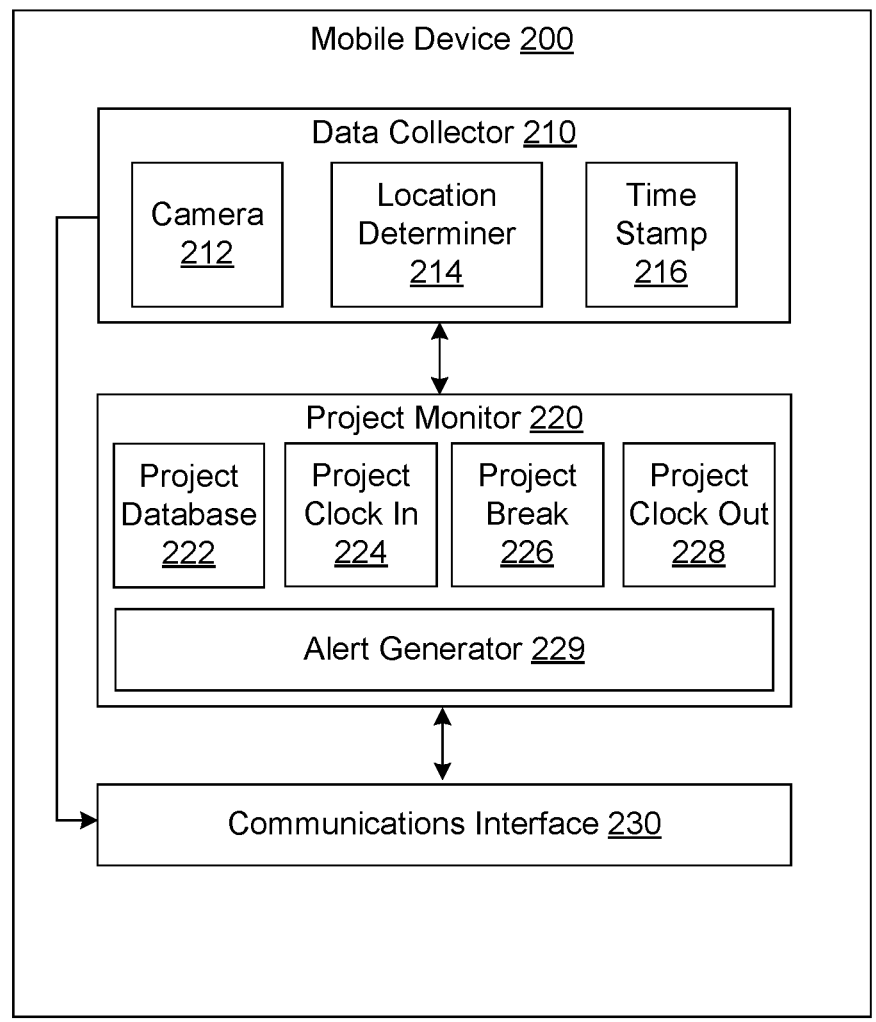
FIG. 2 illustrates a mobile device for implementing some embodiments and aspects of the present disclosure.

FIG. 2 illustrates an example mobile device 200 for tracking and managing mobile workers. By way of example, mobile device 200 may be used to implement mobile device 110 and/or 120 of FIG. 1. Mobile device 200 may include a data collector 210, a project monitor 220, a communications interface 230, and an alert generator 240. The arrangement and number of components in mobile device 200 is provided for purposes of illustration. Additional arrangements, number of components, and other modifications may be made, consistent with the present disclosure.

In some embodiments, data collector 210 may include one or more software and/or hardware components for collecting various types of data associated with a mobile worker. For example, data collector 210 may include a camera 212 that is configured to obtain images/photographs or videos of various aspects of a project at a worksite. Camera 212 may be implemented using any type of camera hardware or software known in the art. For example, camera 212 may be implemented using a charge-coupled device (CCD) sensor or an active pixel sensor (APS) in complementary metal-oxide-semiconductor (CMOS), or any other similar video and photographic camera technologies known in the art.

A mobile worker may use camera 212 to obtain images/photographs or videos that reflect the status of the mobile worker and/or the status of the project being worked by the mobile worker at the worksite. For example, when a mobile worker arrives at the worksite to begin work on a project, the mobile worker may use camera 212 to obtain an image or video that reflects the mobile worker's presence at the worksite. The image or video may also provide an indication that the mobile worker is actively working on the project. For example, the mobile worker may use camera 212 to obtain an image of a portion of the worksite that is the subject of the project, thereby indicating that the mobile worker is actively working to complete the project. Moreover, the mobile worker may provide the indication by using camera 212 to take a video of the mobile worker actively working on the project.

In some embodiments, data collector 210 may include a location determiner 214 that is configured to obtain location data associated with the mobile worker. The obtained location data may reflect the location of the mobile worker. The location data may be used to verify that the mobile worker is located at the worksite when clocked in and working on a project. In some embodiments, the location data may be periodically obtained. For example, location determiner 214 may obtain location data once every hour, once every thirty minutes, or any other period of time. In some embodiments, location determiner 214 may continuously obtain location data. In some other embodiments, location determiner 214 may obtain location data responsive to the occurrence of an event. For example, location determiner 214 may obtain location data each time camera 212 obtains an image/photograph or video. Obtaining location data responsive to camera 212 obtaining an image or a video may improve the accuracy of the data collected by data collector 210 by ensuring that the location data accurately reflect the location of the content in the image or video obtained by camera 212.

Location determiner 214 may include GPS capability and may use the GPS capability to obtain GPS coordinates associated with the mobile worker's location. Other location devices and technologies may be used to obtain the location data. For example, location determiner 214 may be further equipped with wireless networking capability (e.g., Wi-Fi) and may use the wireless networking capability to augment the GPS capability, thereby improving the accuracy of the obtained location data. As another example, other global navigation satellite systems (GNSS) may be used in place of, or in concurrently with, GPS, such as Galileo, GLONASS, BeiDou, DORIS, IRNSS, or any other GNSS known in the art.

In some embodiments, data collector 210 may include a time stamp 216 that is configured to obtain time information associated with the mobile worker. For example, time stamp 216 may obtain the time of day (e.g., in the format of hours:minutes, for example) responsive to an event. As an example, time stamp 216 may obtain the time of day associated with an image or video obtained from camera 212. In other words, time stamp 216 may determine the time of day responsive to camera 212 obtaining an image or a video. As another example, time stamp 216 may obtain the time of day responsive location determiner 214 determining that the mobile worker has left or entered the worksite location. As a further example, time stamp 216 may obtain the time of day responsive to the mobile worker clocking in or out of a project, or beginning or ending a break.

In some embodiments, project monitor 220 may include one or more software and/or hardware components for tracking and managing various aspects of one or more worksite projects associated with a mobile worker. For example, project monitor 220 may include a project database 222 configured to store information associated with the one or more worksite projects associated with a business, customer, subcontract, and/or mobile worker. Project database 222 may include the names and locations of the one or more projects. The projects may be located the same or different worksites, or some combination thereof. Project database 222 may order the projects by name, by location, by distance from the mobile worker (using location determiner 214), by project due date, or by customer.

Project monitor 220 may be configured to receive selection of a project included in project database 222. Project monitor 220 may receive selection of a project in the form of input from the mobile worker. For example, mobile device 200 may include a display screen (not shown), and the projects included in project database 222 may be displayed to the mobile worker. If the display screen is a touchscreen, the mobile worker may select a project by touching a portion of the display screen that corresponds to the project. Alternatively, the mobile worker may select a pushbutton associated with the project.

Project monitor 220 may be configured to display a project clock in button 224 responsive to receiving selection of the project. Project monitor 220 may display a dropdown menu proximate to project clock in button 224 that includes a list of possible tasks the mobile worker is qualified to perform. For example, if the project is a house construction project, and the mobile worker is qualified to perform electrical work and carpentry work, the dropdown menu may include electrical tasks and carpentry tasks for the mobile user's selection. Project monitor 220 may require the user obtain an image or video using camera 212 that reflects at least a portion of the project before using project clock in button 224 to clock into the project. Doing so may improve the ability of mobile device 200 to track and manage mobile workers by ensuring that the mobile worker is at the worksite and working on the appropriate project. Project monitor 220 may also provide the mobile worker with the ability to add notes to the clock in, and as well as add various flags. For example, if the project is time sensitive, the mobile worker may flag the clock in as "Important" or "Urgent", however other flags known in the art may be used.

In some embodiments, project monitor 220 may be configured to track the amount of time the mobile worker spends working on a given project. For example, once the mobile worker selects project clock in 224, project monitor 220 may begin tracking the time. Project monitor 220 may stop tracking the time the mobile worker spends working on a given project responsive to receiving selection of project clock out 228. Project monitor 220 may prompt the mobile worker to use camera 212 to obtain an image that reflects at least a portion of the project before using project clock out button 228 to clock out of the project. Alternatively (or in addition), project monitor 220 may prompt the mobile worker to use camera 212 to obtain a video that reflects at least a portion of the project before using project clock out button 228 to clock out of the project. Doing so may improve the ability of mobile device 200 to track and manage mobile workers by ensuring that the mobile worker has made progress or completed the project.

Project monitor 220 may provide the mobile worker with the ability to enter progress updates that may reflect progress made on a project. Similar to project clock out 228, project monitor 220 may prompt the mobile worker to use camera 212 to obtain an image that reflects at least a portion of the project before entering progress updates. Alternatively (or in addition), project monitor 220 may prompt the mobile worker to use camera 212 to obtain a video that reflects at least a portion of the project before entering progress updates. Doing so may improve the ability of mobile device 200 to track and manage mobile workers by ensuring that the mobile worker is making progress while clocked into the project.

In some embodiments, project monitor 220 may provide the mobile worker with the ability to add notes to the clock out or progress updates, and as well as add various flags. For example, if the mobile worker needs to buy supplies for a project or have a service performed (e.g., tool maintenance or repair paid for by a construction worker, dog grooming services paid for by a dog watcher, etc.), the mobile worker may flag the progress update or clock out as a "Receipt" so that the mobile worker can document any money spent. Accordingly, the business can add the image or video taken by the mobile worker to a database with the flag so that, for example, the business's accountants can filter pictures with a "Receipt" flag to verify that the mobile worker's purchases were appropriate. Other flags known in the art may be used, for example, "Important" or "Urgent" if the project is time sensitive, "Repair" to indicate that the project was a repair, "Issue" or "Problem" if the mobile worker encountered a problem while working on the project, "Confidential" if information relating to the project is sensitive and is to only be shared between the business and the customer, "Recurring" if the project is a type that is routinely performed (this way, the business or the tracking device can send reminders to the customer when service or maintenance needs to be performed again, etc.

In some embodiments, project monitor 220 may be configured to monitor when a mobile worker begins and ends a break, and the amount of time the mobile worker spends on a break. For example, project break 226 may receive a selection from the mobile worker, indicating that the mobile worker has begun their break. Project break 226 may be a push button or a graphical representation on a touch screen that a mobile worker can press to begin and end a break. Project monitor 220 may begin tracking the amount of time the mobile worker spends on their break responsive to the mobile worker beginning their break. Accordingly, project monitor 220 may end tracking the amount of time the mobile worker spends on their break responsive to project break 226 receiving selection from the mobile worker, indicating that the mobile worker has ended their break.

Project monitor 220 may use the amount of time the mobile worker spends on a given project to provide various alerts associated with the amount of time the mobile worker spends working on a given project. For example, project monitor 220 may provide instructions to alert generator 229 for generating an alert when project monitor 220 has determined that the amount of time the mobile worker has spent working on a given project has exceeded a predetermined time threshold, alerting the mobile worker to take a break. As another example, project monitor 220 may provide instructions to alert generator 229 for generating an alert when project monitor 220 has determined that the amount of time the mobile worker has spent working on a given project has exceeded their regular workday hours, alerting the mobile worker they are now working overtime hours. As a further example, project monitor 220 may provide instructions to alert generator 229 for generating a no clock-in alert. A no clock-in alert may alert the mobile worker that their required clock-in time has passed but they have not yet clocked in for a project. Moreover, project monitor 220 may provide instructions to alert generator 229 for generating an away from project alert. An away from project alert may alert the mobile worker when project monitor 220 determines the mobile worker is no longer within the geographical area of the project they are clocked into. For example, project monitor 220 may use the location data obtained from location determiner 214 and compare it to the project location data included in project database 222.

Communication interface 230 may be configured to send and receive data and/or alerts from tracking device 140. For example, mobile device 200 may transmit data collected by data collector 210 (e.g., obtained images and/or videos, location data, timestamps) and/or project monitor 220 (clock in and clock out times, break times, amount of time worked on a given project, projects worked, projects completed). Communication interface 230 may be implemented as a wireless interface and may communicate with tracking device 140 through network 130. Alternatively, or in addition to, communication interface 230 may be implemented as a Bluetooth, NFC, or Wi-Fi Direct interface and may communicate with tracking device 140 via peer-to-peer connection 160.

Communications interface 230 is designed to address errors in the data that happen from time to time in network 130 and/or mobile devices 110/120 (or mobile device 200 if viewing FIG. 2). When data arrives at the communications interface 230 and is either missing required data or the data is not intelligible, communications interface 230 will alert a human operator through an onscreen user interface that data requires review. For example, In the event that camera 212 fails to record an image, communications interface 230 will detect that the data being transmitted is not complete and will alert an operator with an audible and/or visual alert on the onscreen user interface. The operator can then review the data and address the alert, thereby allowing the communications interface 230 to correct the data error and resume normal data processing operations.

In some embodiments, when the network 130 loses connectivity, the system can adapt by enabling all data and content to be stored in mobile devices 110 and/or 120. This allows the mobile worker to continue using the invention despite intermittent or no connection to network 130. When network 130 connection is restored, mobile devices 110 and/or 120 will send the stored data to the tracking device 140.

Figure 3:
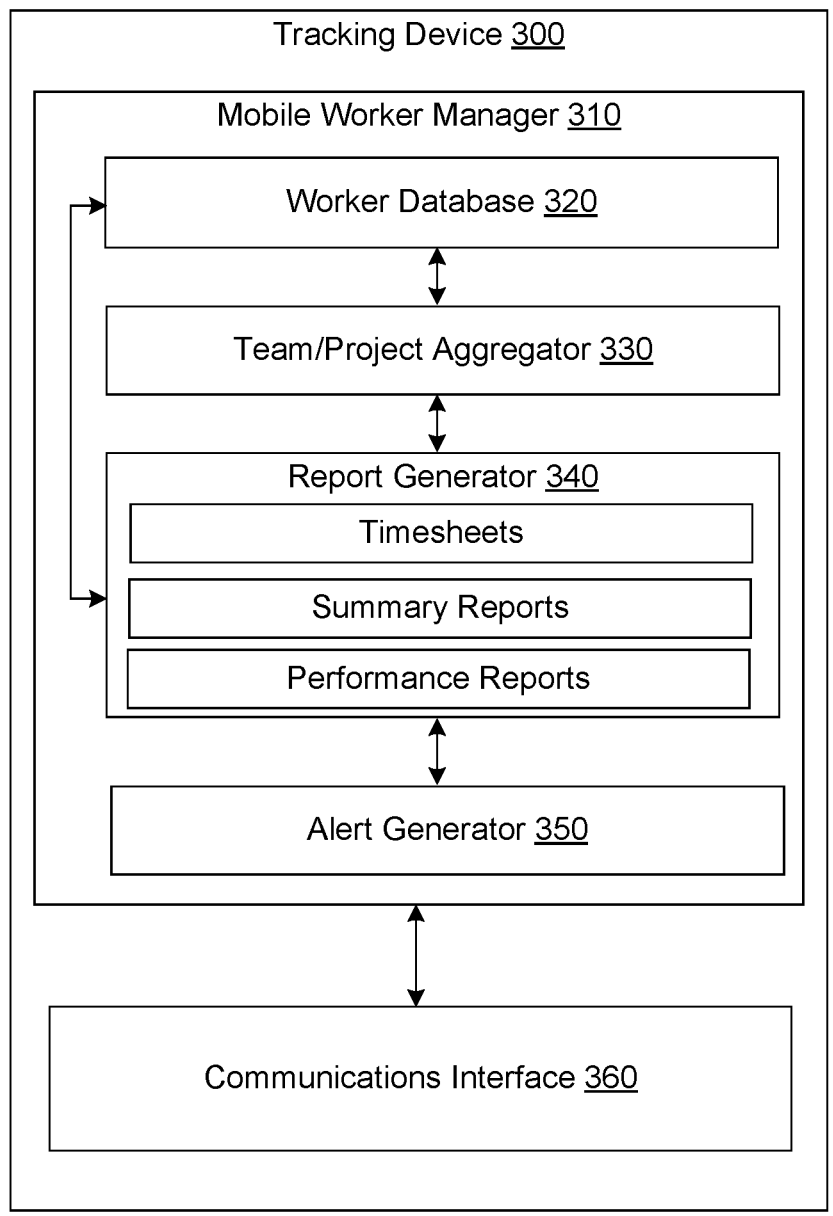
FIG. 3 illustrates an example tracking device or system for implementing some embodiments and aspects of the present disclosure.

FIG. 3 illustrates an example tracking device 300 according to some embodiments and aspects of the present disclosure. In some embodiments, tracking device 300 may be configured for managing mobile workers. By way of example, tracking device 300 may be used to implement tracking device 140 of FIG. 1. Tracking device 300 may include a mobile worker manager 310 and a communications interface 360. The arrangement and number of components in tracking device 300 is provided for purposes of illustration. Additional arrangements, number of components, and other modifications may be made, consistent with the present disclosure.

Communications interface 360 may be configured to send and receive data and/or alerts from mobile devices 110 and 120. For example, communications interface 360 may receive data collected by data collector 210, FIG. 2 (e.g., obtained images and/or videos, location data, timestamps) and/or project monitor 220, FIG. 2 (clock in and clock out times, break times, amount of time worked on a given project, projects worked, projects completed). Communications interface 360 may be implemented as a wireless interface and may communicate with mobile devices 110 and 120 through network 130. Alternatively, or in addition to, communication interface 460 may be implemented as a Bluetooth, NFC, or Wi-Fi Direct interface and may communicate with mobile devices 110 and 120 via peer-to-peer connection 160.

Mobile worker manager 310 may include a worker database 320, a team/project aggregator 330, a report generator 340, and an alert generator 350. In some embodiments, worker database 320, team/project aggregator 330, report generator 340, and alert generator 350 may be implemented as hardware modules configured to execute the functions described herein. In some other embodiments, a worker manager processor (not shown) may be configured to execute the functions of worker database 320, team/project database 330, report generator 340, and alert generator 350. For example, worker manager processor may communicate with a memory/storage device (not shown) that includes worker database 320, team/project aggregator 330, report generator 340, and alert generator 350 in the form of computer-executable instructions, such that worker manager processor may then execute these instructions. As another example, the functions of worker database 320, team/project aggregator 330, report generator 340, and alert generator 350 may be included in worker manager processor, such that worker manager processor is configured to implement these functions.

In some embodiments, worker database 320 may include information corresponding to one or more mobile workers associated with mobile devices 110, 120 that are being tracked by a tracking device 300. For example worker database 320 may include names of the mobile workers, data collected by data collector 210, FIG. 2 (e.g., obtained images and/or videos, location data, timestamps) and/or project monitor 220, FIG. 2 (clock in and clock out times, break times, amount of time worked on a given project, projects worked, projects completed).

In some embodiments, team/project aggregator 330 may aggregate the data included in worker database 320 at the team or project level. For example, aggregated worker data for a given project may provide business managers/owners with an indication of the number of workers working on a given project, the number of workers currently clocked in and working on the project, the images and/or videos taken by workers assigned to the project, and the amount of time each worker has spent working on the project. Accordingly, team/project aggregator 330 may provide business managers/owners with a high-level view of their projects while simultaneously providing detailed views of various types of worker data.

In some embodiments, team/project aggregator 330 may track and aggregate data received from subcontractors or subcontracting businesses similar to how team/project aggregator 330 tracks teams and projects. For example, in some embodiments, team/project aggregator 330 may aggregate the data included in worker database 320 at the subcontractor or subcontracting business level. Aggregated subcontractor data for a given project may provide business managers/owners with an indication of the number of subcontractors or subcontracting businesses associated with a given project, the number of subcontractors or subcontracting businesses currently clocked in and working on the project, the images and/or videos taken by subcontractors or subcontracting businesses associated with the project, and the amount of time each subcontractors or subcontracting businesses has spent working on the project. Accordingly, team/project aggregator 330 may provide business managers/owners with a high-level view of their subcontractors or subcontracting businesses while simultaneously providing detailed views of various types of worker data.

Report generator 340 may generate various types of real-time or aggregated reports using the data included in worker database 320 and the data aggregated by data aggregator 330. For example, report generator 340 may use the names and employee IDs of each mobile worker, and the time worked by each mobile worker to generate timesheets for billing and payroll purposes. If customers are billed at the project level, report generator 340 may generate timesheets at the project level using the data aggregated by team/project aggregator 330. As another example, report generator 340 may use the data aggregated by team/project aggregator 330 to generate a performance report for each project. The performance report may provide indicators for how a project is performing against various metrics, such as project schedule, total budget, monthly budget, milestone schedules, etc. Moreover, report generator 340 may use the aggregated data to generate various earned value management (EVM) reports such as budgeted cost of work performed (BCWP or Earned Value), actual cost of work performed (ACWP), schedule variances (BCWP minus budgeted cost of work scheduled (BOWS)), and/or cost variances (BCWP minus actual cost of work performed). The team/project aggregator can also determine items such as the cost of materials spent on a job, a tracking number for the job, mileage driven, description of work done, location, and photographs.

In some embodiments, report generator 340 may be used to search the data stored in worker database 320. For example, tracking device 300 may receive requests and queries for information via communications interface 360. Report generator 340 may fulfill these requests and queries using data stored in worker database 320. In some embodiments, report generator 340 may search worker database 320 for images and/or videos obtained by mobile workers using mobile devices (e.g., mobile device 110, 120, or 200). In some embodiments, report generator 340 may search worker database 320 for clock-ins, clock-outs, and breaks taken by mobile workers using mobile devices (e.g., mobile device 110, 120, or 200). In some other embodiments, report generator 340 may search worker database 320 for any combination thereof.

Report generator 340 may limit the data provided in response to a search or query. For example, report generator 340 may limit search results to only clock-ins, only clock-outs, only photographs, only videos, only data provided by a specific mobile worker, only data associated with a specific customer, only data associated with a specific type of work (e.g., electrical repair, dog walking, etc.), only data obtained between specific dates, only data obtained from specific subcontractors, or any combination thereof. This data may include items such as the cost of materials spent on a job, a tracking number for the job, mileage driven, description of work done, location, and photographs.

Alert generator 350 may generate various alerts based on the data received from mobile devices 110 and 120. For example, alert generator 350 may generate a break alert. A break alert may alert the mobile worker to take a break when mobile worker manager 310 has determined that the mobile worker has been clocked in to one or more projects during a given day for longer than maximum time allowed by law or allowed by the employer/customer. As another example, alert generator 350 may generate an overtime alert. An overtime alert may alert the mobile worker that their regular workday is nearing completion and that they are about to begin overtime hours. The mobile worker's employer/customer may use mobile worker manager 310 to prevent overtime by warning the mobile worker that they are not authorized to begin overtime work. As a further example, alert generator 350 may generate a no clock-in alert. A no clock-in alert may alert the mobile worker that their required clock-in time has passed but they have not yet clocked in for a project. Moreover, alert generator 350 may generate an away from project alert. An away from project alert may alert the mobile worker when mobile worker manager 310 determines the mobile worker is no longer within the geographical area of the project they are clocked into. For example, mobile worker manager 310 may use the location data received from mobile device 110 or 120 and compare it to the project location data associated with the mobile worker.

Figure 4:
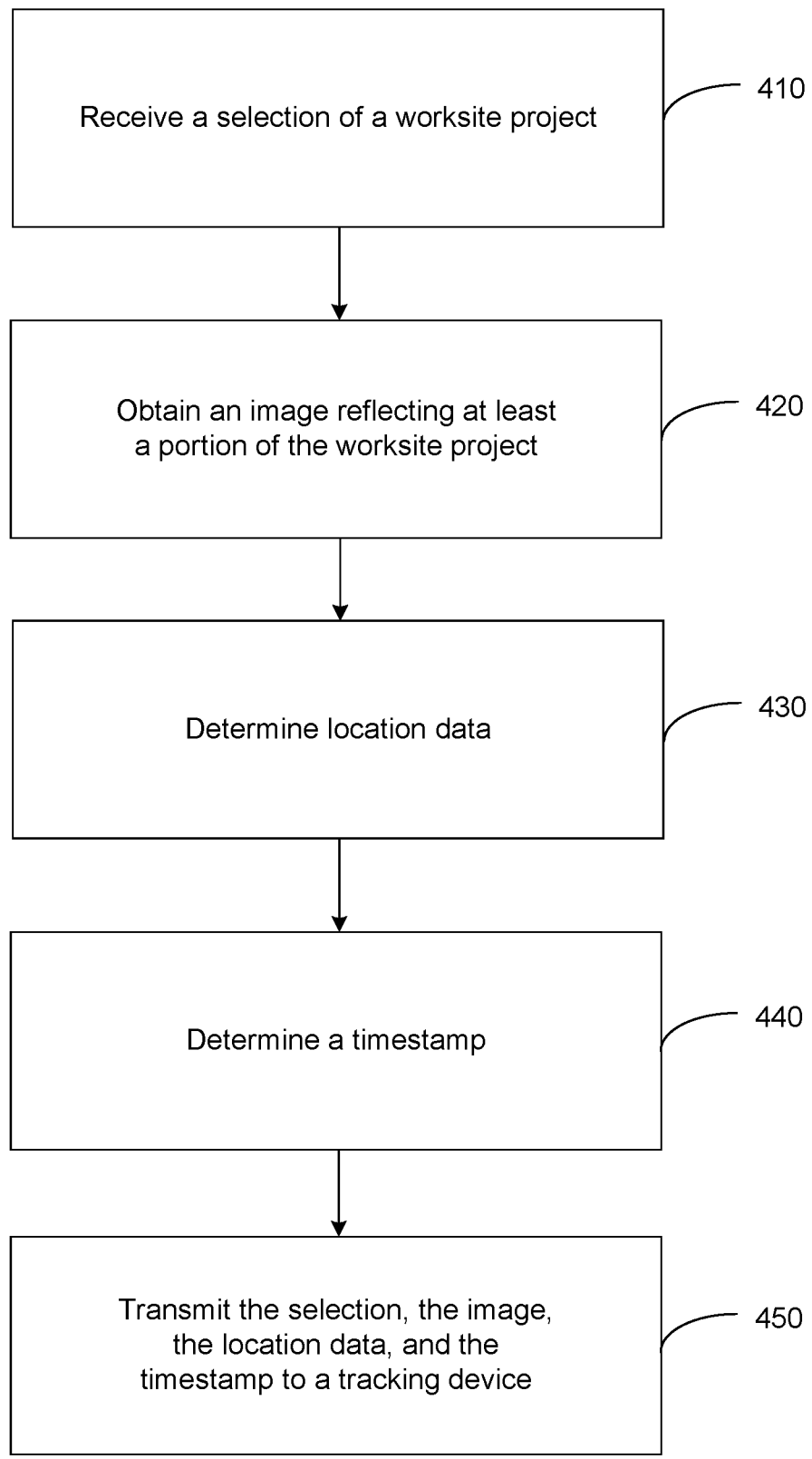
FIG. 4 illustrates an example method for managing mobile workers, according to some embodiments and aspects of the present disclosure.

FIG. 4 depicts a flowchart of an example method 400, consistent with some embodiments and aspects of the present disclosure. Method 400 may be implemented, for example, for managing mobile workers. In some embodiments, method 400 may be implemented as one or more computer programs executed by one or more processors. Moreover, in some embodiments, method 400 may be implemented by a mobile device (e.g., mobile device 110, 120, or 200 having one or more processors executing one or more computer programs stored on a non-transitory computer readable medium) or a tracking device (e.g., tracking device 104, 300 having one or more processors executing one or more computer programs stored on a non-transitory computer readable medium). In some embodiments, method 400 may be implemented by a combination of a mobile device and a tracking device.

In some embodiments, example method 400 may include receiving selection of a worksite project at 410. For example, the mobile device and/or tracking device may receive selection from a mobile worker. The mobile worker may select the project from among a plurality of worksite projects associated with the business, customer, subcontract, and/or mobile worker.

In some embodiments, example method 400 may include obtaining an image and/or video at 420. The image and/or video may reflect at least a portion of the project selected by the mobile worker. For example, the mobile worker may use a camera included in the mobile device or tracking device to obtain the image and/or video. The obtained image and/or video may be used to verify that the mobile worker is at the worksite and is beginning work on the selected project.

In some embodiments, example method 400 may include determining location data at 430. The location data may correspond to a location of the mobile worker that has selected the project, and may include, for example, a set of GPS coordinates corresponding to the mobile worker's location. For example, the mobile device and/or tracking device may determine the location data responsive to obtaining the image and/or video reflecting at least a portion of the project. Determining the location data responsive to obtaining the image and/or video may ensure that the location data accurately reflects the mobile worker's location when the image and/or video was obtained.

In some embodiments, example method 400 may include determining a timestamp at 440. The timestamp may reflect the time of day that the image and/or video was obtained. For example, the mobile device and/or tracking device may determine the timestamp responsive to obtaining the image and/or video reflecting at least a portion of the project.

In some embodiments, example method 400 may include transmitting the project selection, the obtained image and/or video, the location data, and the timestamp to a tracking device at 440. The tracking device may use the transmitted data to verify that the mobile worker is at the worksite working on the project.

Certain features which, for clarity, are described in this specification in the context of separate embodiments may also be provided in combination as a single embodiment. Conversely, various features which, for brevity, are described in the context of a single embodiment may also be provided in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

What is claimed is:

1. A system for constructing and indexing a verification database for mobile workers, comprising:
at least one processor that:
identifies location data corresponding to a location of a mobile worker;
sends to a mobile device associated with the mobile worker, a list of projects from a database of worksite projects associated with at least one of a business, a customer, a subcontractor, or the mobile worker, wherein the list of projects is ordered by distance from the mobile worker, and the location of the mobile worker is used to determine the ordered list of projects by comparing the distances between a mobile worker's location and locations of the projects;
receives from the mobile device associated with the mobile worker, a selection of a project from the list of projects;
displays, in response to the selection, a project clock in button;
prompts the mobile worker to obtain an image or video reflecting at least a portion of the project prior to allowing the mobile worker to activate the project clock in button;
obtains from the mobile device associated with the mobile worker, an image or video reflecting at least a portion of the project;
determines the obtained image or video being complete or incomplete, and provides an alert if the image or video is incomplete;
provides information associated with the image or video indicating that at least a portion of the project is complete;
determines a timestamp reflecting a time of day the image or video was obtained;
constructs and indexes a verification database including the received selection, the obtained image or video, the identified location data, and the determined timestamp;
enables filtering and searching of the verification database by the at least one of the business, the customer, the subcontractor, or the mobile worker;
prompts, in response to a request to clock out or a progress update, the mobile worker to obtain an additional image or video reflecting at least a portion of the project; and
generates a break alert when a mobile worker has been clocked in to one or more projects during a given day for longer than a predetermined period of time.

2. The system according to claim 1, wherein the processor:
updates the location data;
determines that the location data is outside a geographical area associated with the selected project; and
transmits to a device associated with the at least one of the business, the customer, the subcontractor, or the mobile worker, an alert indicating that the updated location data is outside the geographical area.

3. The system according to claim 1, wherein the processor:
receives, from the mobile device, a clock-in time;
compares a current time with the clock-in time; and
when the comparison indicates that the mobile worker has been clocked into the selected project for longer than a maximum time allowed by law or allowed by the at least one of the business, the customer, the subcontractor, or the mobile worker:
transmits to a device associated with the at least one of the business, the customer, the subcontractor, or the mobile worker, an alert indicating that the mobile worker has been clocked into the selected project longer than the maximum time.

4. The system according to claim 1, wherein the location data comprises global positioning system coordinates of the mobile device.

5. The system according to claim 1, wherein determining the timestamp comprises identifying timestamp data associated with the image or video.

6. The system according to claim 1, wherein determining the timestamp comprises determining a time at which the processor obtained the image or video from the mobile device.

7. The system according to claim 1, wherein the processor:
receives, from the mobile device, the additional image or video; and
in response to receiving the additional image or video, permits the mobile device to send, to the processor, a clock-out time.

8. The system according to claim 7, wherein the processor
receives, from the mobile device, a flag associated with the clock-out time; and
updates the verification database to include the received flag.

9. The system according to claim 1, wherein the processor
receives, from the mobile device, a flag associated with the progress update and the selected project; and
updates the verification database to include the received flag.

10. The system according to claim 9, wherein the flag is a receipt flag, and the processor
receives an indication of a cost of a purchase associated with the receipt flag;
receives, from the mobile device, the additional image or video; and
updates the verification database to include the received indication of cost and the received additional image or video.

11. The system according to claim 1, wherein the processor:
receives, from a device associated with the at least one of the business, the customer, the subcontractor, or the mobile worker, a query;
identifies, based on the received query, a relevant index in the verification database;
obtains, from the verification database, one or more images or videos using the identified index; and
transmits, to the device associated with the at least one of the business, the customer, the subcontractor, or the mobile worker, a reporting including the obtained images or videos.

12. The system according to claim 11, wherein the processor:
obtains, from the verification database, clock-in times and clock-out times using the identified index,
wherein the report further includes the obtained clock-in times and clock-out times.

13. The system according to claim 1, wherein the processor:
generates one or more timesheets for a particular project based on clock-in times and clock-out times in the verification database; and
transmits the generated one or more timesheets to a device associated with the at least one of the business, the customer, the subcontractor, or the mobile worker.

14. The system according to claim 1, wherein the processor:
generates one or more performance reports for a particular project using the verification database, wherein a performance report includes an indicator of at least one of a schedule and a budget for the particular project coupled with one or more images or videos associated with the particular project in the verification database; and
transmits the generated one or more performance reports to a device associated with the at least one of the business, the customer, the subcontractor, or the mobile worker.

15. The system according to claim 14, wherein the performance report further includes at least one of a budgeted cost of work performed for the particular project compared to an actual cost of work performed for the particular project and a schedule variance for the particular project.

16. A system for constructing and indexing a verification database for mobile workers, comprising:
at least one processor that:
identifies location data corresponding to a location of a mobile worker;
sends to a mobile device associated with the mobile worker, a list of projects from a database of worksite projects associated with at least one of a business, a customer, a subcontractor, or the mobile worker, wherein the list of projects is ordered by distance from the mobile worker, and the location of the mobile worker is used to determine the ordered list of projects by comparing the distances between a mobile worker's location and locations of the projects;
receives from the mobile device associated with the mobile worker, a selection of a project from the list of projects;
displays, in response to the selection, a project clock in button;
prompts the mobile worker to obtain an image or video reflecting at least a portion of the project prior to allowing the mobile worker to activate the project clock in button;
obtains from the mobile device associated with the mobile worker, an image or video reflecting at least a portion of the project;
determines the obtained image or video being complete or incomplete, and provides an audio or visual alert if the image or video is incomplete;
provides information associated with the image or video indicating that at least a portion of the project is complete;
determines a timestamp reflecting a time of day the image or video was obtained;
constructs and indexes a verification database including the received selection, the obtained image or video, the identified location data, and the determined timestamp;
enables filtering and searching of the verification database by the at least one of the business, the customer, the subcontractor, or the mobile worker;
receives, from the mobile device, a receipt flag;
receives an indication of a cost of a purchase associated with the receipt flag;
transmits, to the mobile device, a prompt for an additional image or video reflecting the purchase;
receives, from the mobile device, the additional image or video; and
updates the verification database to include the received indication of cost and the received additional image or video.

17. The system according to claim 16, wherein the processor
receives, from the mobile device, an indication of a task associated with the selected project; and
updates the verification database to include the task.

18. The system according to claim 17, wherein the processor receives, from the mobile device, a request to clock in;
transmits, to the mobile device, a prompt to submit the indication of the task; and
in response to receiving the indication of the task, permits the mobile device to send a clock-in time.

19. The system according to claim 18, wherein the processor:

sends to the mobile device associated with the mobile worker a list of tasks for which the mobile worker is authorized,
wherein receiving the indication of the task comprises receiving a selected task from the sent list of tasks.

20. The system according to claim 16, wherein an alert generator generates a break alert when a mobile worker has been clocked in to one or more projects during a given day for longer than a predetermined period of time.

* * * * *